United States Patent
Koppstein et al.

[11] Patent Number: 6,138,118
[45] Date of Patent: Oct. 24, 2000

[54] METHOD AND SYSTEM FOR RECONCILING CONCURRENT STREAMS OF TRANSACTIONS IN A DATABASE

[75] Inventors: Peter E. A. Koppstein, Princeton Junction; Benjamin James Park, Highland Park, both of N.J.; Dennis E. Shasha, New York, N.Y.

[73] Assignee: Telcordia Technologies, Inc., Morristown, N.J.

[21] Appl. No.: 09/126,168

[22] Filed: Jul. 30, 1998

[51] Int. Cl.[7] .................................................... G06F 17/30
[52] U.S. Cl. .................................. 707/8; 705/26; 705/37; 707/102; 707/200; 707/201; 707/202; 707/203
[58] Field of Search ........................... 705/26, 37; 707/8, 707/102, 200–203

[56] References Cited

U.S. PATENT DOCUMENTS

| | | | |
|---|---|---|---|
| 4,914,569 | 4/1990 | Levine et al. | 707/8 |
| 5,504,900 | 4/1996 | Raz | 707/10 |
| 5,546,580 | 8/1996 | Seliger et al. | 707/8 |
| 5,551,023 | 8/1996 | Alonso | 707/8 |
| 5,564,044 | 10/1996 | Pratt | 707/8 |
| 5,701,423 | 12/1997 | Crozier | 345/335 |
| 5,781,910 | 7/1998 | Gostanian et al. | 707/201 |
| 5,878,434 | 3/1999 | Draper et al. | 707/10 |
| 6,012,060 | 1/2000 | Loaiza et al. | 707/10 |

*Primary Examiner*—Hosain T. Alam
*Assistant Examiner*—Jean Bolte Fleurantin
*Attorney, Agent, or Firm*—Joseph Giordano

[57] ABSTRACT

A method and system for reconciling in a scheduling database the execution of a high priority stream of transactions that is concurrent with a low priority stream of transactions comprise the steps of copying a portion of the database into a temporary storage, establishing the high priority stream in the database, establishing the low priority stream in the temporary storage, reconciling the low priority stream with the high priority stream, and establishing some or all of the low priority stream of transactions in the database such that the high priority stream has data priority over the low priority stream and the resulting database satisfies certain safety and liveness constraints. Specifically, the reconciliation step further comprises the steps of 1) identifying pinged tasks in the database that are unassigned before the execution of the high priority stream of transactions in the database, 2) identifying the tasks that are assigned to pinged resources in the database, 3) unassigning the tasks in the temporary database that correspond to the identified tasks in the database, 4) assigning to unpinged resources some of the tasks that are unassigned in the temporary storage and that are unpinged in the database, and 5) establishing in the database the resulting assignment relations of the temporary storage.

5 Claims, 6 Drawing Sheets

METHOD AND SYSTEM FOR RECONCILING CONCURRENT STREAMS OF TRANSACTIONS IN A DATABASE

BACKGROUND OF THE INVENTION

The present invention relates generally to management of concurrent transactions in a database, and more particularly, to systems and methods for reconciling concurrent streams of transactions in a scheduling database in such a manner that assures database integrity.

The fundamental purpose of a database is to execute transactions. A transaction is a unit of work that consists of a sequence of operations such as, read, write, update, and/or delete, against a database. A measure of the correctness of the state of the database is referred to as database integrity. Database integrity refers to the problem of ensuring that two or more concurrently executing transactions do not interfere with each other in such a manner as to produce an incorrect state in the database. An application programmer must ensure that each transaction produces a correct state, provided that each transaction begins when the database is in a correct state, and executes in isolation of all other transactions. For example, each transaction in an accounting application must leave assets balanced with liabilities and equity.

Interference among transactions can take many forms. One form of interference is the "lost-update" problem, which is illustrated in FIG. 1. As shown in FIG. 1, transaction A attempts to increment the value of field F in record R by 1. Concurrent with transaction A, transaction B attempts to multiply the value of field F by 2. At time t1, field F has a value of 4, and transaction A reads record R. At time t2, transaction B reads record R. At time t3, transaction A increments by 1 the value of field F that transaction A read at time t1 (i.e., 4 plus 1), and updates field F with the resulting value of 5. At time t4, transaction B multiplies by 2 the value of field F that transaction B read at time t2 (i.e., 4 multiplied by 2), and updates field F with the resulting value of 8. Transaction A's update to record R is lost in this example because transaction B overwrites field F at time t4 without considering that transaction A had changed the value of field F at time t3.

One known solution to the lost-update problem is to assign different execution priorities to each transaction. Specifically, a higher execution priority process P1 would take control over any computational resources that it would need to execute a transaction before a low priority process P2 executes its transaction. As a result, the two transactions have the effect on the database as if they are each executed one at a time. The transaction in the low priority process must wait until the transaction in the high priority process completes its sequence of operations. In the example shown in FIG. 1, by assigning a high priority to a process that includes transaction A and a low priority to a process that includes transaction B, transaction B cannot read record R until after transaction A updates record R at time t3. By the time transaction B reads record R, the modification made by transaction A is reflected in record R, and thus, the lost-update problem is avoided.

However, assigning execution priority to each transaction does not guarantee "data priority," when multiple streams of transactions concurrently attempt to modify a database, where each stream may include several transactions. Even though each transaction in one stream may have execution priority over transactions in another stream, the transactions in the two streams may still interleave. In other words, a lower execution priority transaction can still overwrite the modifications in the database that were made by a higher execution priority transaction. Thus, when modifications of a higher priority stream conflict with the modifications of a lower priority stream, to assure data priority, the modifications of the higher priority stream are established in the database, whereas the modifications of the lower priority stream are not established in the database.

Hence, in the prior art database systems, the only way to ensure that a high priority stream of transactions acquires data priority over a low priority stream of transactions is to convert each stream into a single transaction. This ensures that the high priority stream executes completely before the low priority stream starts execution so that data priority holds when the high priority stream completes its execution. However, if the database entries that each stream attempts to modify are not known in advance, then each stream must acquire exclusive access to the entire database during execution in order to assure data priority over the other streams. Moreover, if streams have long execution times and if new streams of transactions arise over time, then each stream would have to wait an excessive amount of time in order to complete, which could cause blocking and deadlocks in the database.

Thus, it is desirable to have a method and system for reconciling in a database the execution of a first stream of transactions that is concurrent with a second stream of transactions such that the first stream has data priority over the second stream, and thus, ensuring database integrity without converting each stream into a single transaction.

DESCRIPTION OF THE INVENTION

The present invention comprises a method and system for reconciling the execution of concurrent streams of transactions in a scheduling database. A scheduling database generally comprises resources, tasks, and the associated assignment relations, all of which are governed by various timing rules, for example, specific time windows for completing a task. A scheduling database may comprise one of two assignment relations: 1) a task may be assigned to zero or one resource; or 2) a task may be assigned to zero, one or several resources. A task that is not assigned to any resource is referred to as "unassigned" or "pending."

The present invention comprises a method and system for reconciling the execution of a high priority stream of transactions that is concurrent with a low priority stream of transactions, both of which modify tasks, resources, and their associated assignment relations in a scheduling database. A modification to the database by a high priority stream is hereinafter referred to as a "ping." Thus, a task is "pinged" if a high priority stream modifies the assignment of the task by reassigning the task from one resource to another or to a different time within a resource's list of assigned tasks. Similarly, a resource is "pinged" if a high priority stream assigns new tasks to the resource, unassigns one or more tasks from the resource, or rearranges tasks assigned to the resource.

The high priority stream may be initiated by, for example, users (e.g. as the result of new orders or cancellations) and the low priority stream may be initiated by, for example, an intelligent scheduling system. One objective of the present invention is to maintain a database that is consistent with the modifications of the high priority stream, while satisfying as much as possible the assignment relations produced by the low priority stream and obeying desired safety and liveness constraints. A safety constraint requires that the scheduling database will not ever reach an undesired state for an appropriate definition of "undesired" state. A liveness constraint requires that the scheduling database will eventually reach a desired state for an appropriate definition of "desired" state.

The present invention further comprises a method and system for reconciling in a scheduling database the execution of a high priority stream of transactions that is concurrent with a low priority stream of transactions by establishing the high priority stream in the database, establishing the low priority stream in a temporary storage, reconciling the low priority stream with the high priority stream, during which time further modifications to a portion of the database are not allowed, and establishing some or all of the low priority stream of transactions in the database such that the high priority stream has data priority over the low priority stream and the resulting database satisfies desired safety and liveness constraints. Reconciling the low priority stream with the high priority stream generally means discarding those assignment relations in the low priority stream that conflict with those in the high priority stream, assigning to unpinged resources in the database some of the tasks that are unassigned in the temporary storage and that are unpinged in the database, and establishing in the database the resulting assignment relations in the temporary storage.

Specifically, reconciling the low priority stream with the high priority stream comprises the steps of 1) identifying pinged tasks in the database that were pending before the execution of the high priority stream of transactions in the database, 2) identifying the tasks that are assigned to pinged resources in the database, 3) unassigning the tasks in the temporary database that correspond to the identified tasks in the database, 4) assigning to unpinged resources some of the tasks that are unassigned in the temporary storage and that are unpinged in the database, and 5) establishing in the database the resulting assignment relations of the temporary storage.

The method and system of the present invention assures data priority as well as desired safety and liveness constraints, and thus, maintains database integrity when executing concurrent streams of transactions. Specifically, the method and system of the present invention reconciles the execution of a high priority stream of transactions that is concurrent with a low priority stream of transactions based only on the knowledge of the pinged entries in the database, the state of the database prior to the execution of the high priority stream, and the transactions in the low priority stream. Thus, the duration of the locking intervals in the database is reduced to the duration of the reconciliation step alone rather than to the duration of executing the entire low priority stream. Furthermore, the number of the entries in the database that must be locked during the reconciliation step is reduced since the pinged entries in the database are not locked. By reducing the number of entries that are locked in the database, the number of database deadlocks and transaction roll-backs are reduced, resulting in an enhanced database performance.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BEST MODE FOR CARRYING OUT THE INVENTION

Reference will now be made in detail to the present preferred embodiments of the invention, examples of which are illustrated in the accompanying drawings. Wherever possible, the same reference numbers will be used throughout the drawings to refer to the same or like parts.

The present invention comprises a method and system for reconciling in a scheduling database the execution of a high priority stream of transactions that is concurrent with a low priority stream of transactions by executing the high priority stream in the database, executing the low priority stream in a temporary storage, and reconciling the low priority stream with the high priority stream during which time further modifications to a portion of the database are not allowed. A scheduling subsystem reconciles the assignment relations in the low priority stream with those of the high priority stream by executing some or all of the low priority stream transactions in the database such that the high priority stream has data priority over the low priority stream and the resulting database satisfies desired safety and liveness constraints.

Specifically, the scheduling subsystem reconciles the low priority stream with the high priority stream by 1) identifying pinged tasks in the database that are unassigned before the execution of the high priority stream of transactions in the database, 2) identifying the tasks that are assigned to pinged resources in the database, 3) unassigning the tasks in the temporary database that correspond to the identified tasks in the database, 4) assigning to unpinged resources some of the tasks that are unassigned in the temporary storage and that are unpinged in the database, and 5) establishing in the database the resulting assignment relations of the temporary storage. An assignment relation may include, for example, the status of a task, the resource assigned to that task, and an estimated start time of the task. The elements of the assignment relation may be stored as a single structure or as separate entries in different tables, as the particular implementation of an assignment relation is not essential to the practice of the present invention.

The reconciliation step assures that the resulting database satisfies the following liveness constraint independent of the particular assignment relations among the tasks and resources: If a task must be performed between times t1 and t2 and an unpinged resource has the qualification to perform the task, then, after the completion of the reconciliation step, the resource should not be idle between times t1 and t2 when the task is not performed between times t1 and t2.

Figure 1:
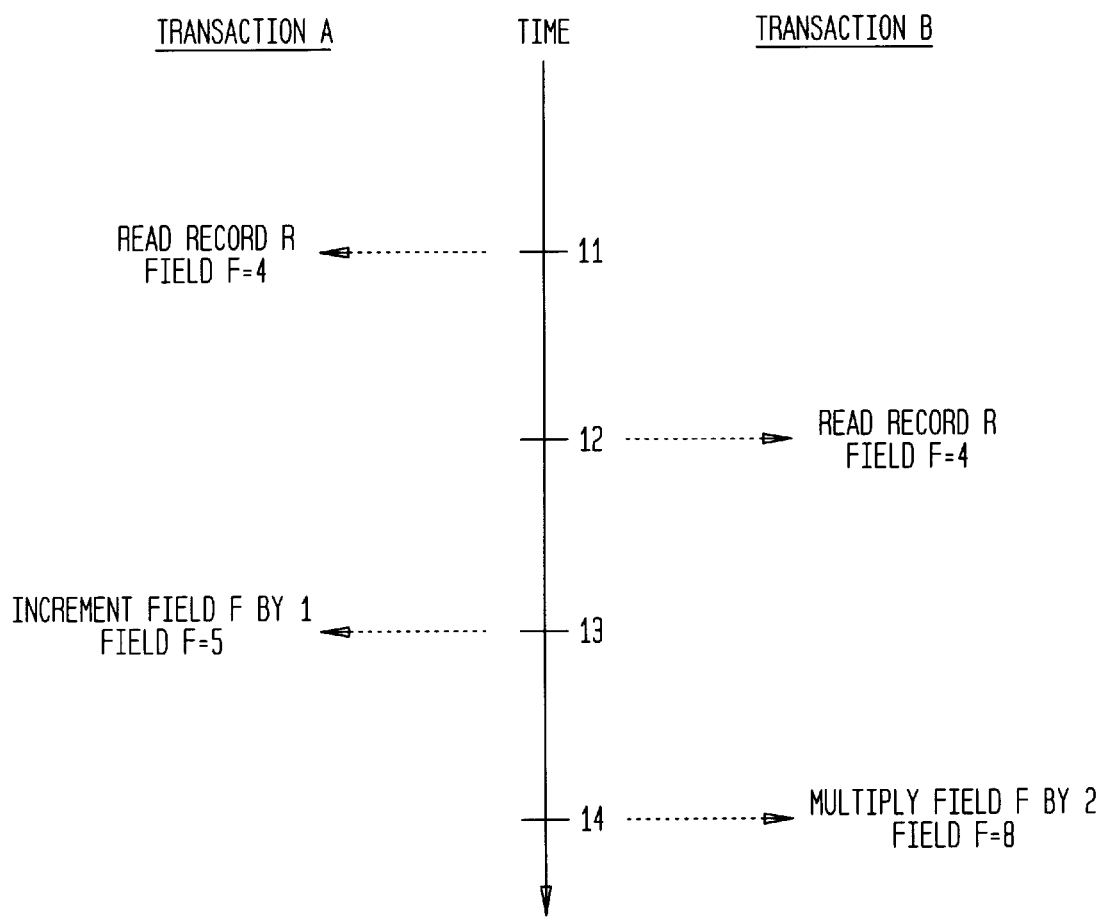
FIG. 1. illustrates the state of a prior art database when multiple transactions concurrently attempt to modify the database.
Figure 2:
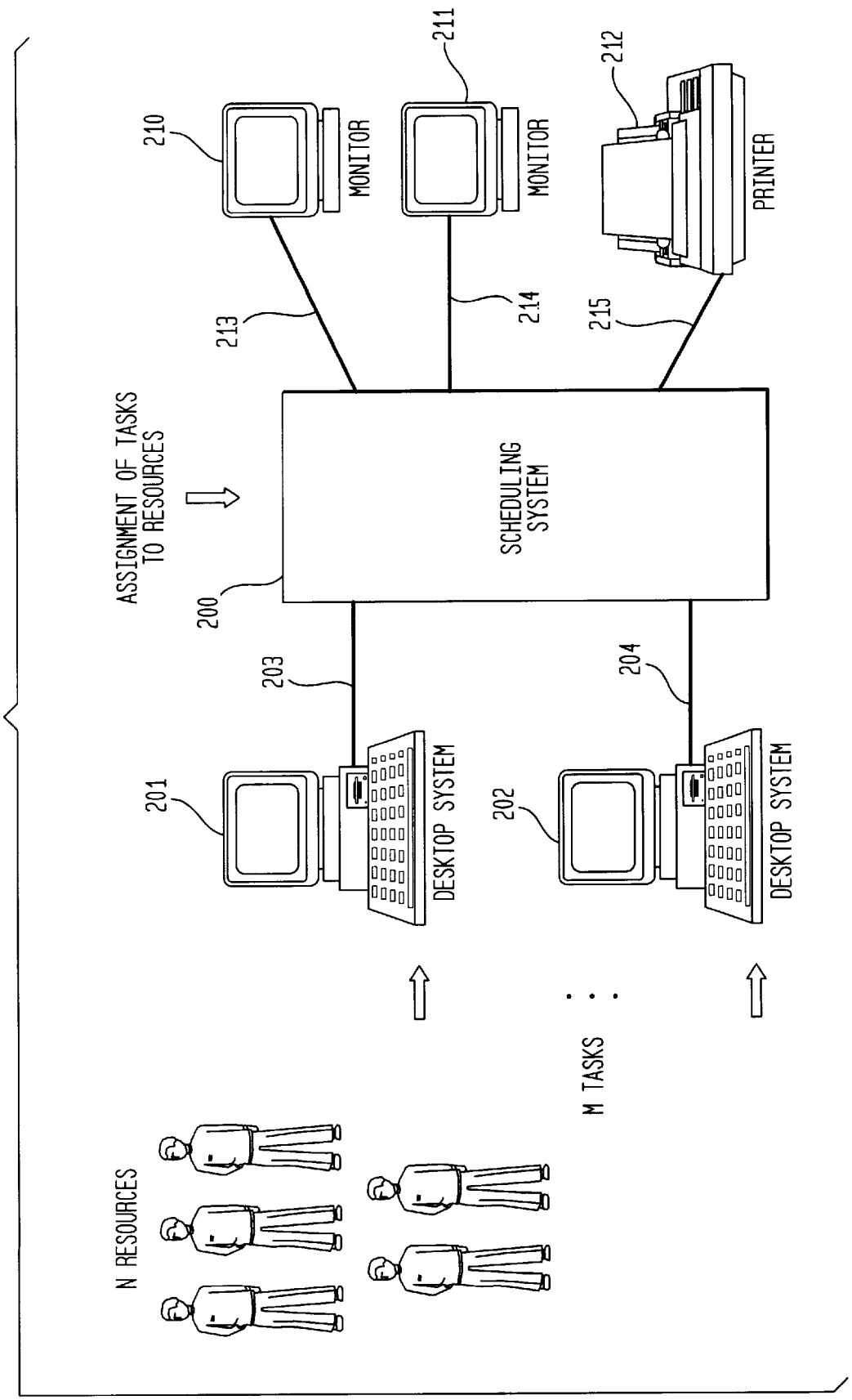
FIG. 2 is block diagram of a system for assigning M tasks to N resources in accordance with an embodiment of the present invention.

FIG. 2 illustrates a block diagram of a system for assigning M tasks to N resources in accordance with an embodiment of the present invention. As shown, scheduling system 200 interfaces with desktop computers 201 and 202, monitors 210 and 211, and printer 212 via connections 203, 204, 213, 214, and 215, respectively. Via desktop computers 201 and 202, a user may create and modify tasks, resources, and the assignment relations associated with the tasks and the resources, which are then stored in scheduling system 200. Furthermore, scheduling system 200 automatically assigns tasks to resources and vice versa, and, if necessary, modifies the assignment relations input by the user.

In accordance with an embodiment of the present invention, scheduling system 200 includes resources, tasks, and associated assignment relations, all of which are governed by various timing rules, for example, specific time windows for completing a task. Scheduling system 200 may assign a task to zero or one resource. In accordance with another embodiment of the present invention, a task may be assigned to zero, one or several resources. A task that is not assigned to any resource is referred to as "unassigned" or "pending."

Figure 3:
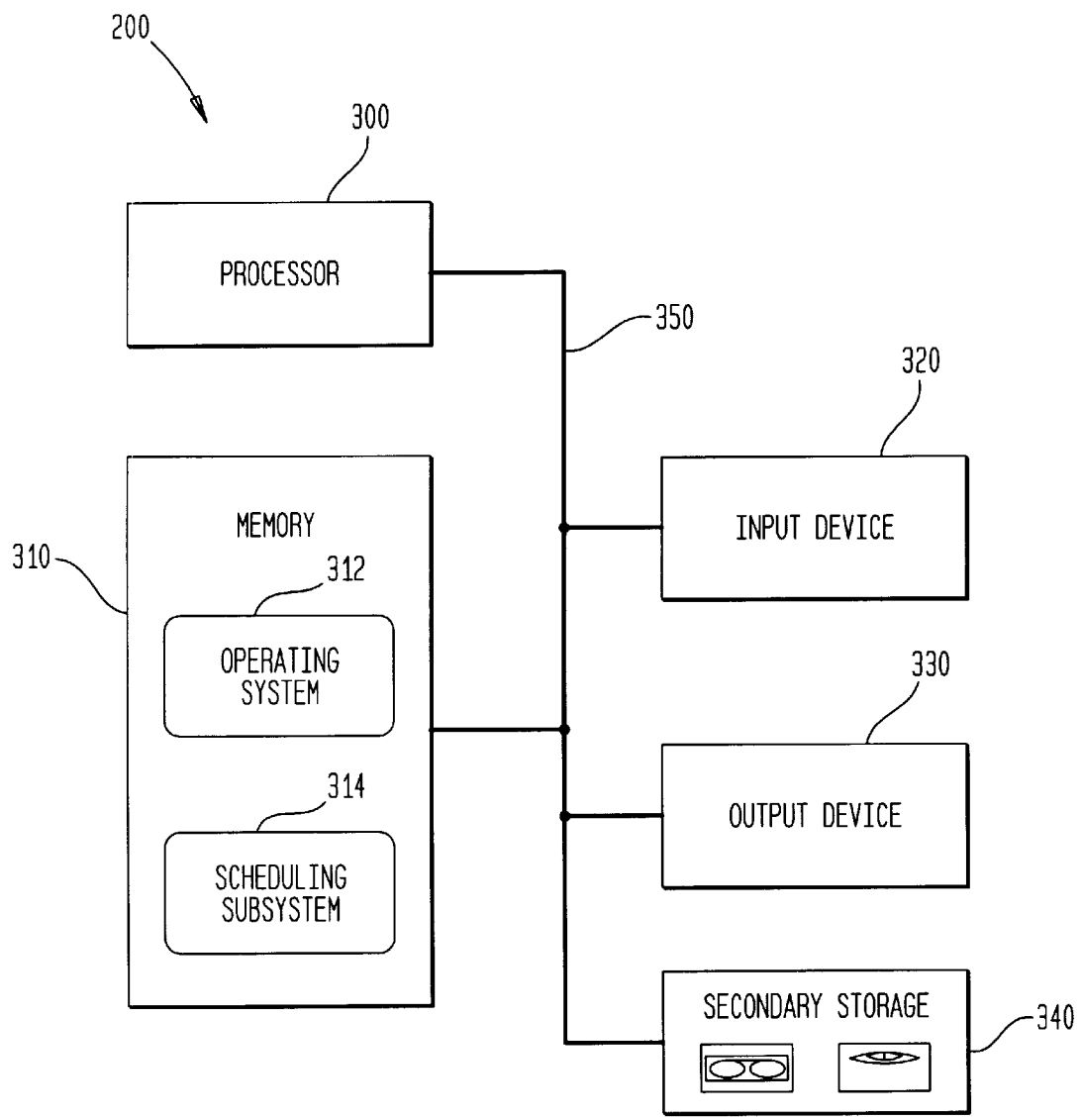
FIG. 3 illustrates components of a scheduling system in accordance with an embodiment of the present invention.

FIG. 3 illustrates the components of scheduling system 200 in accordance with an embodiment of the present invention. As shown, scheduling system 200 comprises processor 300, memory 310, input device 320, output device 330, and secondary storage 340, all of which are connected to high speed bus 350. Memory 310 includes operating system 312 and scheduling subsystem 314, which comprise data and a set of executable instructions that processor 300 executes. Input device 320 may include a standard terminal or a desktop computer. Output device 330 includes a terminal and a printer.

Secondary storage 340 comprises a disk drive and a tape drive or CD Read Only Memory (ROM). From the tape drive or CD ROM, software and data may be loaded onto the disk drive, which can then be copied into memory 310. Similarly, software and data in memory 310 may be copied onto the disk drive, which can then be loaded onto the tape drive or CD ROM.

Figure 4:
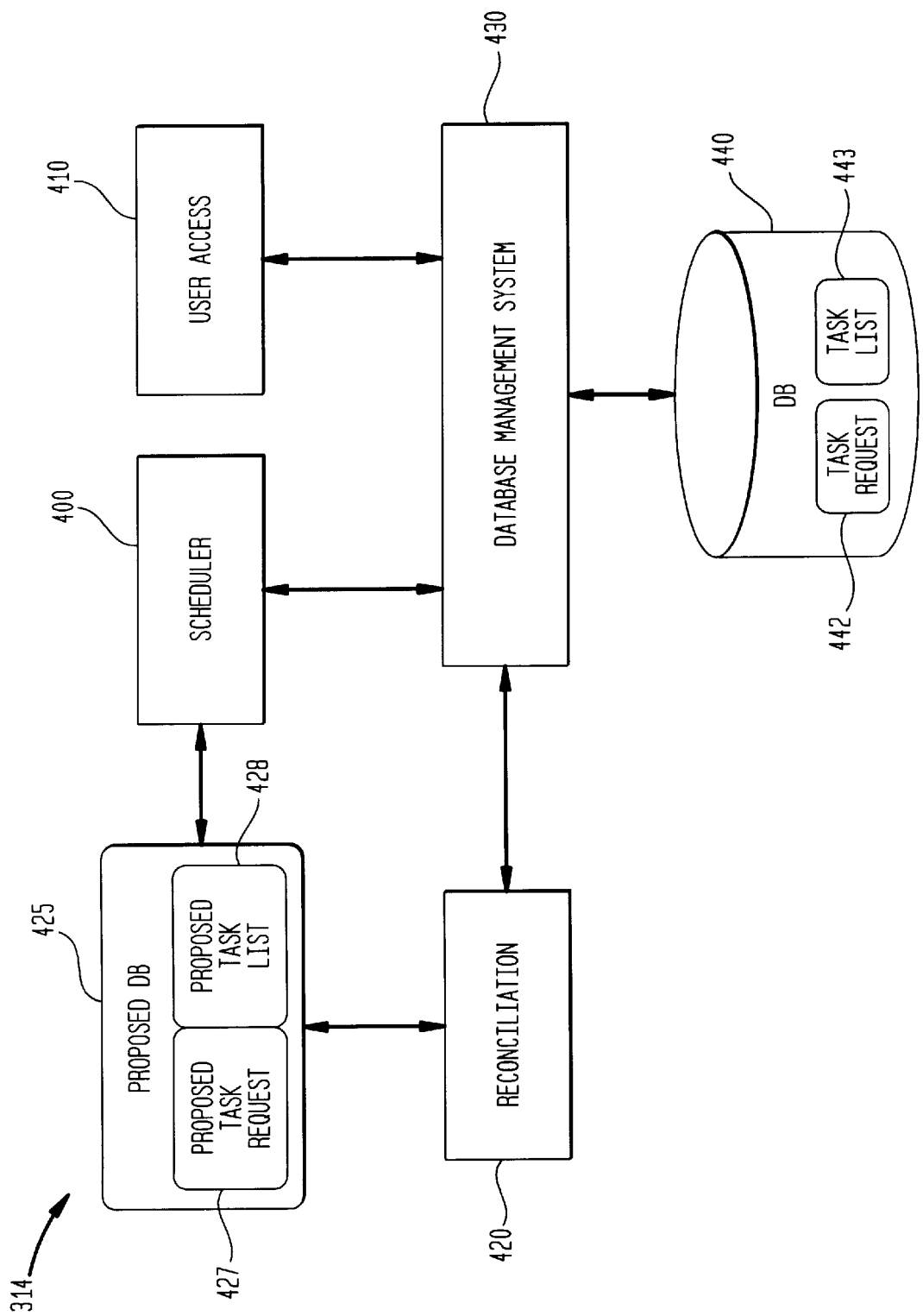
FIG. 4 is a block diagram of a scheduling subsystem in accordance with an embodiment of the present invention.

FIG. 4 is a block diagram of scheduling subsystem 314 in accordance with an embodiment of the present invention. As shown, scheduling subsystem 314 includes scheduler 400, user access 410, reconciliation 420, and database management system (DBMS) 430, which includes database 440. User access 410 provides a user interface for adding, modifying, and deleting tasks, resources, and their associated assignment relations, all of which are stored in database 440. Once tasks and resources are inputted into the system, scheduler 400 assigns the inputted tasks to resources and vice versa, and, if necessary, modifies the existing assignment relations of tasks and resources. Reconciliation 420 controls the concurrent attempts of user access 410 and scheduler 400 to access and modify tasks, resources, and their associated assignment relations in database 440.

DBMS 430 provides scheduler 400, user access 410, and reconciliation 420 with read and write access to database 440. DBMS 430 may, for example, be a commercial database management system application such as Oracle version 7.3. The specific type of the database management system is not necessary to the practice of the present invention, as other database management systems known to one of ordinary skill in the art may be used instead.

Database 440 includes task request 442 and task list 443 tables. Each entry in task request 442 generally maps a task to its assigned resource. Each entry includes, for example, a task identifier (task_d), resource identifier (resource_id), status, scheduled date of completion of task (scheduled_date), estimated start time of the task (estimated_start_time), and a time-stamp of when the entry is last modified and/or created. A primary key for task request 442 may include task_id.

The status field in an entry of task request 442 represents the status of a task, which may be, for example, "pending," "assigned," "dispatched," or "completed." As explained above, "pending" status indicates that a task is not assigned to a resource. "Assigned" status indicates that a task is assigned to a resource. "Dispatched" status indicates that a resource has started to work on a task. "Completed" status indicates that a task has been completed.

Each entry in task list 443 provides information about each resource's assigned tasks. An entry includes, for example, a resource identifier (resource_id), task identifier (task_id), scheduled date for completion of task (scheduled_date), actual starting date of task, actual completion date of task, and a time-stamp of when the entry is last modified and/or entered. A primary key for task list 443 may include resource_id and scheduled_date.

Figure 5:
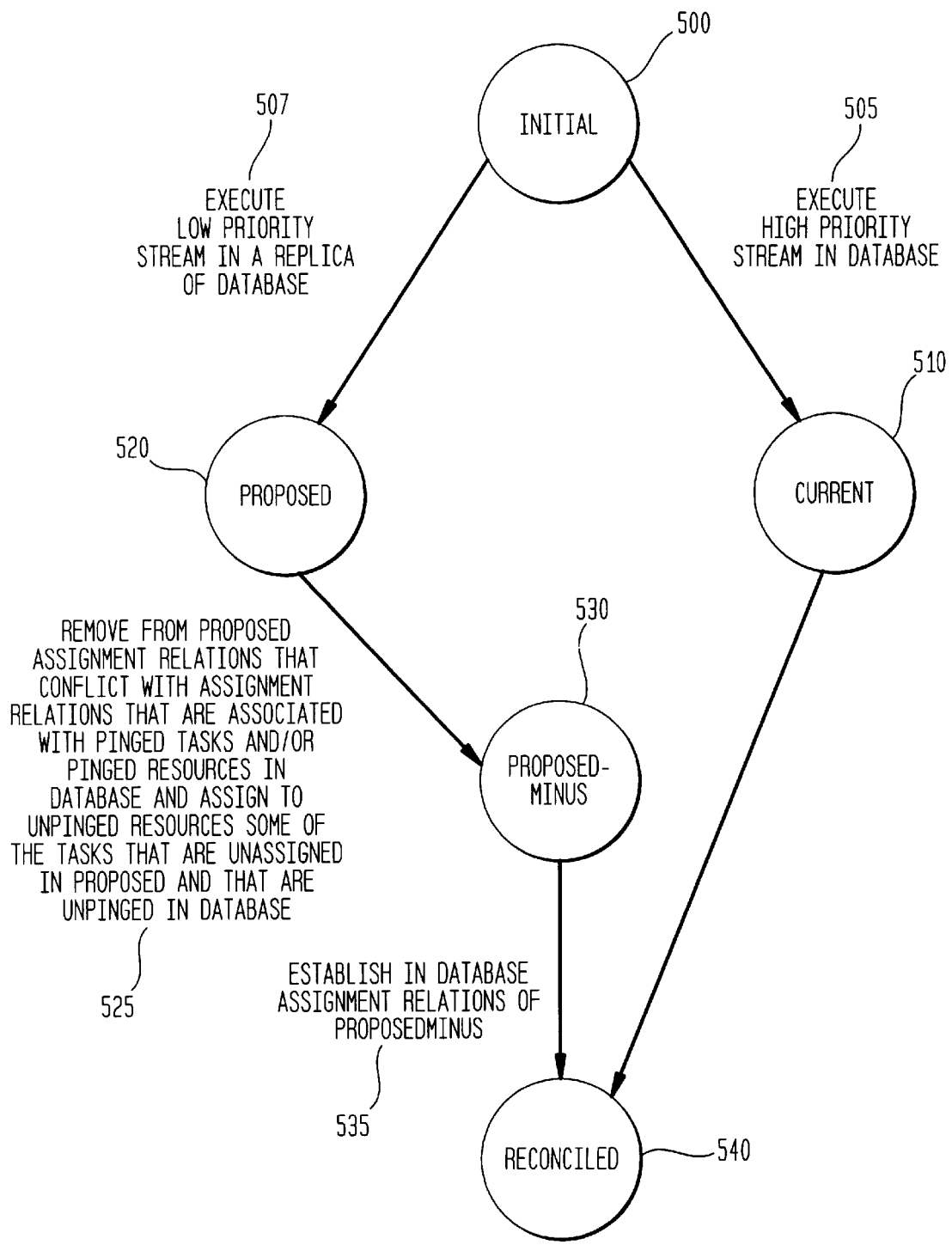
FIG. 5 is a state diagram of a scheduling subsystem in accordance with an embodiment of the present invention.

FIG. 5 is a state diagram for scheduling subsystem 314 in accordance with an embodiment of the present invention. At a given point in time, scheduling subsystem's 314 state may be defined by the tasks, resources, and assignment relations of tasks to resources, which are stored in database 440. This initial state is shown as INITIAL (state 500). In INITIAL state, two independent events in scheduling subsystem may occur, which would modify the state of tasks, resources, and assignment relations of tasks to resources stored in database 440. First, users may enter new and/or modify existing tasks, resources, and assignment relations, in which case user access 410 generates a stream of high priority transactions to modify database 440 (step 505). Once user access 430 executes the stream of high priority transactions in database 440, scheduling subsystem's 314 new state is defined by the new and/or modified tasks, resources, and assignment relations in the modified database 440. This state is shown as CURRENT (state 510).

Second, concurrent with user access 410, scheduler 400 modifies existing tasks, resources, and assignment relations in database 440 by generating a stream of low priority transactions for potential execution in database 440. However, scheduler 400 does not directly execute the stream of low priority transactions in database 440. Scheduler 400 executes the low priority stream in a replica or a copy of a portion of database 440 in INITIAL state, which is stored in memory 310 and shown as proposed_db 425 in FIG. 4. The copied portion of database 440 may include tasks, associated assignment relations, and resources that are, for example, available on a particular date for assignment. Alternatively, the copied portion may include the entire database 440 in INITIAL state.

When reconciliation 420 executes the low priority stream in proposed_db 425 (step 507), scheduling subsystem's 314 new state is defined by the modified tasks, resources, and assignment relations proposed task request table 427 and proposed task list table 428 included in the proposed_db 425. This state is shown as PROPOSED (state 520). Furthermore, scheduler 400 does not modify tasks that have status "dispatched" or "completed."

As will be shown in detail below, reconciliation 420 reconciles the concurrent high priority transactions in database 440 with the low priority transactions in proposed_db 425. Specifically, reconciliation 420 removes from proposed_db 425 the assignment relations that conflict with the assignment relations in database 440 that are associated with pinged tasks and/or pinged resources and assigns to unpinged resources some of the tasks that are unassigned in proposed_db 425 and that are unpinged in database 440 (step 525). Step 525 results in a new state in scheduling subsystem 314, which is shown as state PROPOSEDMINUS (state 530) in FIG. 5. Reconciliation 420 then establishes in database 440 the remaining assignment relations in proposed_db 425 (step 535). Step 535 results in another new state in scheduling subsystem 314, which is shown as state RECONCILED (state 540). When scheduling subsystem 314 reaches state RECONCILED, it has established in database 440 some or all of the low priority transactions, which modified assignment relations in database 440, such that the modifications are consistent with the high priority transactions in database 440, and thus, assuring the integrity of database 440.

Figure 6:
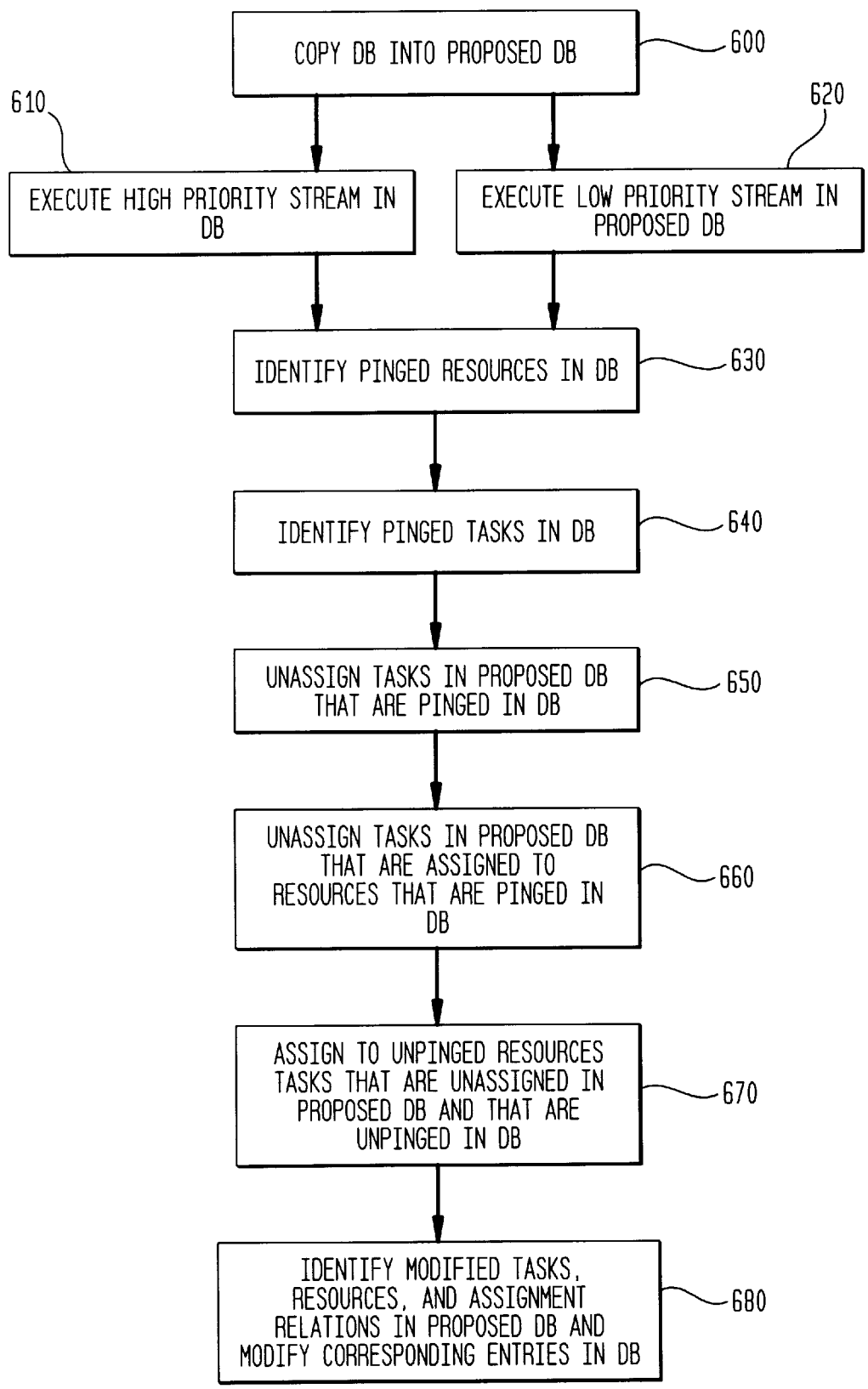
FIG. 6 is a flow chart of the steps that a scheduling subsystem performs when reconciling the execution of concurrent streams of transactions in a scheduling database in accordance with an embodiment of the present invention.

FIG. 6 is a flow chart of the steps that scheduling subsystem 314 performs when reconciling concurrent streams of transactions in database 440 in accordance with an embodiment of the present invention. Scheduler 400 copies database 440 (or at least a subset of database 440 as identified based on specifications made via user access 410) into proposed_db 425, including the time of the last modification (referred to as "proposed_stamp") of each of the copied tasks, resources, and assignment relations (step 600). Alternatively, scheduler 400 may store the date and time of the copy in proposed_stamp. User access 410 generates and executes a high priority stream of transactions to create new and/or modify existing tasks, resources, and assignment relations in database 440 (step 610). Concurrent with user access 410, scheduler 400 generates and executes a low priority stream of transactions to modify existing tasks, resources, and assignment relations in proposed_db 425 (step 620).

Reconciliation 420 then reconciles the low priority transactions in proposed_db 425 with the high priority modifications in database 440 as follows (steps 630 through 670): Reconciliation 420 identifies the pinged resources in database 440 by, for example, executing a first stored procedure to query database 440 for entries in task list 443 that have time-stamps greater than the proposed_stamp (step 630). Specifically, the first stored procedure uses the proposed_stamp as a search key to task list 443, and uses a read-lock to lock the resources, tasks, and assignment relations, which scheduler 400 copied into proposed_db 425 at step 600. If an entry in task list 443 has a time-stamp greater than the proposed_stamp, then the resource associated with that entry has been pinged since the last time scheduler 400 copied database 440 into proposed_db 425. The first stored procedure returns the subset of resources that have been pinged. Alternatively, the first stored procedure may use a write lock to lock the entire task list 443. Other locking or concurrency control methods known to one of ordinary skill in the art may be used instead, as the particular locking mechanism is not essential to the practice of the present invention.

Next, reconciliation 420 identifies the pinged tasks in database 440 by, for example, executing a second stored procedure to query database 440 for the tasks that have status pending in proposed_db 425 and that their associated entries in task request 442 have time-stamps greater than proposed_stamp (step 640). Specifically, if an entry in task request 442 has a time-stamp greater than the proposed_stamp, then the task associated with that entry has been pinged since the last time scheduler 400 copied database 440 into proposed_db 425. Alternatively, the second stored procedure may use a write lock to lock the entire task request 442. Other locking methods known to one of ordinary skill in the art may be used instead, as the particular locking mechanism is not essential to the practice of the present invention.

Reconciliation 420 unassigns each assigned task in proposed_db 425 that is pinged in database 440 by, for example, deleting the entry associated with that task in proposed_db 425 (step 650). Reconciliation 420 then unassigns each task in proposed_db 425 that is assigned to resources that are pinged in database 440 by, for example, removing from proposed_db 425 the assignment relation associated with the task (step 660). To satisfy the liveness constraint, reconciliation 420 then assigns to unpinged resources some of the tasks that are unassigned in proposed_db 425 and that are unpinged in the database (step 670).

Finally, reconciliation 420 identifies the tasks, resources, and assignment relations in proposed_db 425 that have been modified by scheduler 400, and uses write locks to modify the corresponding entries in database 440 (step 680). When DBMS 430 successfully modifies the corresponding entries in database 440, reconciliation 420 releases the locks on database 440.

DETAILS OF RECONCILIATION

As explained above, a scheduling database may include one of two assignment relations between tasks and resources: 1) a task may be assigned to zero or one resource; or 2) a task may be assigned to zero, one, or several resources. In accordance with an embodiment of the present invention, the first assignment relation between tasks and resources must satisfy a safety constraint that each task x can be assigned to at most one resource, and the resource must be one of a plurality of singleton sets in allowable(x), where a singleton set is a set comprising a single resource and allowable(x) represents resources that have the requisite attributes for performing task x. The final state of the scheduling database must also satisfy the following liveness constraint, independent of the particular assignment relations among tasks and resources: Suppose that the timing rules permit an unpinged task x to be done between times t1 and t2, resource y can perform task x (i.e.,{y} belongs to allowable(x)), and y is not pinged. Then, it must not be the case that resource y is idle between times t1 and t2 and task x is not completed in a way that satisfies task x's timing rules.

In accordance with another embodiment of the present invention, the second assignment relation must satisfy a generalized safety constraint that each task x can be assigned to at most one set in allowable(x), where each set may comprise of a plurality of resources that, together, have the requisite attributes for performing task x. The final state of the database must also satisfy the following generalized liveness constraint: Suppose that the timing rules permit an unpinged task x to be done between times t1 and t2, resource set y can do task x (i.e., the set y belongs to allowable(x)), and all resources in y are unpinged. Then it must not be the case that both all resources in y are idle between times t1 and t2 and task x is never completed in a way that satisfies task x's timing rules.

Specifically, an assignment may be a function that maps tasks to resources at certain times or to a status called "pending." Alternatively, an assignment may be a set-valued function, where a task could be assigned to several resources. Any task not mapped to a resource (i.e., any task not mapped to a non-empty set of resources) is mapped to "pending." This may be formally represented as PENDING=

{task x| assigned (x)=pending). Furthermore, pinged tasks are those whose assignment function has been changed by the high priority stream of transactions. Similarly, pinged resources are those resources whose assignment function has been modified by the high priority stream.

A scheduling database may include one of five states in accordance with an embodiment of the present invention: 1) INITIAL state represents the original, unlocked state of the database (prior to execution of transactions in the database); 2) CURRENT state represents the state of the database that results from the execution of high priority stream of transactions (at the time the reconciliation process commences, this is the state of the database); 3) PROPOSED state represents the state of the database that results from the execution of the low priority stream of transactions on the INITIAL state; 4) PROPOSEDMINUS state represents the state of the database that results from removing the assignment relations in PROPOSED that conflict with assignment relations associated with pinged tasks and/or pinged resources in CURRENT and from assigning to resources some of the tasks that are unassigned in PROPOSED and that are unpinged in CURRENT; and 5) RECONCILED state represents the state of the database that results from reconciliation of PROPOSED state with CURRENT state.

If S represents one of the five database states identified above, then S:x represents the value of x in S. For example, if x is a task, then INITIAL: assigned(x) is the value of assigned(x) in database state INITIAL. In other words, INITIAL:assigned(x) is the resource to which task x is assigned (or in general the set of resources) in database state INITIAL. Furthermore, the following notations will be hereinafter used:

pinged[X] represents those members of X that are pinged, i.e.{x in X| pinged(x)=true};
  T represents the set of resources in INITIAL (i.e., T=INITIAL:resources);
  P represents the set of pending tasks in INITIAL (i.e., P=INITIAL:PENDING);
  new_tasks are those tasks in CURRENT that are not in INITIAL;
  discarded_tasks are those tasks in INITIAL that are not in CURRENT;
  pinged[T] represents the set of resources present in INITIAL that are pinged;
  pinged[P] represents the set of tasks present in INITIAL that are pinged;
  an element of pinged[P] is referred to as a pinged PENDING. Furthermore, a pinged PENDING task may still have status "pending" in database state CURRENT.

To allow high priority streams to execute without substantial delay, it is desirable to reconcile the low priority streams with the high priority streams, subject to the safety and liveness constraints stated above, without having access to details of the CURRENT state beyond knowing which tasks and resources have been pinged. This can be achieved because of the following lemma: Let LeaveAlone be the set of all tasks assigned to pinged resources (INITIAL and new) in the CURRENT state, together with all pinged tasks that are pending in the CURRENT state. For brevity, let recent_resource be those resources that have entered the system since INITIAL, i.e. recent_resource=CURRENT:resource−INITIAL:resource. Formally, LeaveAlone can be represented as follows:

LeaveAlone={x in task|
  ((CURRENT:assigned(x) is in recent_resource or pinged[T]) or
  (CURRENT:assigned(x)=pending and x is in pinged[task]) or
  (x is in discarded_tasks))}.

If assigned is a set-valued function, then CURRENT:assigned(x) must have a non-null intersection with recent_resource or pinged[T]. To ensure that the entire CURRENT state does not have to be read when performing the reconciliation, LeaveAloneConstructed can be defined as the set of pinged tasks that were pending in INITIAL state, together with all tasks that were assigned to pinged resources in INITIAL state. LeaveAloneConstructed can be represented as follows:

LeaveAloneConstructed={ x in task|
  ((INITIAL:assigned(x) is in pinged[T]) or
  (INITIAL:assigned(x)=pending and pinged(x)=true) or
  (x is in new_tasks))}.

If assigned is a set-valued function, then INITIAL:assigned must have a non-null intersection with pinged[T].

The following lemma is proved for the case of an assignment function in which a task is either mapped to a single resource or to "pending," but also applies to the case in which a task may be mapped to several resources. Consider the following lemma: LeaveAloneConstructed=LeaveAlone. The following proves that LeaveAlone is a subset of LeaveAloneConstructed. First, consider a task x that is assigned to a pinged resource Y in the CURRENT state. This can be represented as follows: CURRENT:assigned(x) is either in pinged[T] or in recent_resource.

Furthermore, task x could have been assigned to Y in one of four ways:

i) x was assigned to Y in the INITIAL state (i.e. INITIAL:assigned(x)=Y), in which case, x was assigned to a pinged resource in the INITIAL state, and hence, INITIAL:assigned(x) is in pinged[T];
  ii) x was assigned to another resource Y' in the INITIAL state (i.e., INITIAL:assigned(x)=Y') and then was assigned to Y in CURRENT. In this case, Y' would be pinged, and x would be in the INITIAL state of a pinged resource. Thus, INITIAL:assigned(x) is in pinged[T]. This holds true even if Y had not been a resource in INITIAL state;
  iii) x was pending in INITIAL and then was moved to Y in CURRENT. Then x would be in pinged PENDING (i.e., INITIAL:assigned(x)=pending and pinged(x)=true); or
  iv) x is new and was moved to Y in CURRENT. Thus, x is in new_tasks.

A pinged task x in CURRENT:PENDING may be represented as follows: CURRENT:assigned(x)=pending. Task x may have been in one of two states prior to being pinged: 1) x was either pending; or 2) was assigned to a resource in INITIAL state. This subset relationship holds true for two reasons:

i) if x had been pending in the INITIAL state, then x is a pinged PENDING, and thus, x is in pinged[P]. This may be represented as INITIAL:assigned(x)=pending and pinged(x)=true; or
  ii) if x had been assigned in the INITIAL state to some resource Y, then Y has been pinged (i.e., x is in pinged[T]). This may be represented as INITIAL:assigned(x) is in pinged[T].

Finally, in the case of a discarded task x, there are two possibilities: i) task x was pending in the INITIAL state and then was pinged when it was discarded (i.e., INITIAL:assigned(x)=pending and pinged(x)=true); or ii) task x was assigned to some resource Y in INITIAL and then was removed, causing that resource to be pinged (i.e., INITIAL:assigned(x) is in pinged[T]).

The following proves that LeaveAloneConstructed is a subset of LeaveAlone. Let x be a task in the INITIAL state for a pinged resource T, which may be formally represented as INITIAL:assigned(x) is in pinged[T]. Accordingly, task x may be in one of the following three states:

i) x is still assigned either to the same or a different resource (i.e., CURRENT:assigned(x) is in pinged[T]);

ii) x has become pending so both INITIAL:assigned(x) and x itself have been pinged (CURRENT:assigned(x)=pending and x is in pinged[task]); or iii) x has been discarded (i.e., x is in discarded_tasks).

If x is a pinged task that was pending in INITIAL state (i.e., INITIAL:assigned(x)=pending and pinged(x)=true), then in CURRENT state task x may be in one of three states:

i) if x is in CURRENT:PENDING, then since x is pinged CURRENT:assigned(x)=pending and x is in pinged [task];

ii) if x is moved to the schedule of some resource Y, then Y has been pinged so
CURRENT:assigned(x) is in pinged[T] or in recent_resource; or iii) if x is in new_tasks, then x will be either pinged in pending status or on a task list
(i.e., (CURRENT:assigned(x) is in pinged[T] or recent_resource)) or (CURRENT:assigned(x)=pending and x is in pinged[task])).

Thus, LeaveAlone contains task x. Furthermore, RECONCILED includes the assignment relations associated with all tasks in the set LeaveAlone in CURRENT and the assignment relations of all other tasks in PROPOSEDMINUS. In other words, the assignment relations associated with the LeaveAlone tasks are not modified by the assignment relations in PROPOSEDMINUS.

RECONCILIATION STEPS

The reconciliation method comprises the steps of: 1) identifying pinged[T] and pinged[P] from CURRENT; and 2) determining the necessary modifications to CURRENT in order to achieve RECONCILED based solely on the identity of pinged[T], pinged[P], INITIAL, and PROPOSED. Specifically, step (2) of the reconciliation further includes the following steps:

a) From PROPOSED, for x in LeaveAloneConstructed, perform unassign(x) (i.e., return task x to pending). Furthermore, to achieve liveness, let task y be a TruePendingTask if y is unassigned and is not in LeaveAlone. Next, assign TruePendingTasks to unpinged resources until the remaining available resources are either unsuitable for the remaining TruePendingTasks or do not meet the timing requirements for the remaining TruePendingTasks. In general, insert task y into a collection of gaps in unpinged resources where x belongs to allowable(y). This results in the database state PROPOSEDMINUS.

b) RECONCILED is achieved from the disjoint union of the assignment relations associated with pinged tasks and pinged resources in CURRENT together with the assignment relations associated with tasks and resources in PROPOSEDMINUS.

Assuming that PROPOSED and CURRENT individually satisfy the safety constraint (ensured by the transactions in the low and high priority streams, respectively), the database state resulting from the liveness step a) satisfies the safety constraint because the assignment relations associated with tasks in LeaveAlone are taken from CURRENT and the assignment relations associated with all other tasks are taken from PROPOSED. In other words, since PROPOSED and CURRENT each satisfies the safety constraint, the disjoint union of PROPOSEDMINUS and CURRENT will also satisfy the safety constraint.

Thus, the high priority stream maintains data priority over the low priority stream since all pinged tasks and resources in CURRENT are in the database. The database satisfies the liveness constraint because of the liveness step a) of the reconciliation. Note that the liveness step does not violate safety or data priority, because the tasks assigned in the liveness step are not in the set LeaveAlone and the tasks transition from the pending status to the assigned status.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for ensuring data integrity within a database with respect to the concurrent execution of a first higher priority stream of transactions with a second lower priority stream of transactions, wherein the database comprises tasks, resources, and assignment relationships between the tasks and the resources, said method comprising the steps of:

copying a portion of the database into storage;

establishing the first higher priority stream in the database;

establishing the second lower priority stream in the storage; and reconciling the second lower priority stream with the first higher priority stream such that the first stream has data priority over the second stream and the database satisfies predetermined liveness and safety constraints, wherein said reconciling step comprises:

identifying all tasks and resources that have been modified in the database since copying a portion of the database into storage;

identifying the tasks in the storage that are assigned to modified resources in the database;

identifying the tasks in the storage that are modified in the database;

unassigning in the storage the resources assigned to tasks for those tasks identified as being modified in the database or as being assigned to modified resources;

assigning unmodified resources from the database to a portion of the tasks in the storage that are unmodified in the database and require resources; and establishing a disjoint union of the assignment relationships in the storage together with the assignment relationships associated with modified tasks and modified resources in the database.

2. The method according to claim 1, wherein said step of establishing a disjoint union further comprises the steps of:
deleting from the database the assignment relationships that are modified in the storage and that are associated with unmodified tasks and unmodified resources; and
copying into the database the assignment relationships that are modified in the storage and that are associated with unmodified tasks and unmodified resources.

3. The method of claim 1 wherein said step of copying a portion of the database into a storage comprises copying the tasks, the resources, and the assignment relationships in a portion of the database into the storage.

4. A system for ensuring data integrity within a database with respect to the concurrent execution of a first higher priority stream of transactions with a second lower priority stream of transactions, wherein the database comprises tasks, resources, and assignment relationships between the tasks and the resources, said system comprising:
a storage;
means for copying a portion of the database into the storage;
means for establishing the fist higher priority stream in the database;
means for establishing the second lower priority stream in the storage; and
means for reconciling the second lower priority stream with the first higher priority stream such that the first stream has data priority over the second stream and the database satisfies predetermined liveness and safety constraints wherein said reconciling means comprises:
means for identifying all tasks and resources that have been modified in the database since the copying of a portion of the database into storage;
means for identifying the tasks in the storage that are assigned to modified resources in the database;
means for identifying the tasks in the storage that are modified in the database;
means for unassigning in the storage the resources assigned to tasks for those tasks identified as being modified in the database or as being assigned to modified resources;
means for assigning unmodified resources from the database to a portion of the tasks in the storage that are unmodified in the database and require resources; and
means for establishing a disjoint union of the assignment relationships in the storage together with the assignment relationships associated with modified tasks and modified resources in the database.

5. A computer readable medium capable of causing a computer system to perform a method for ensuring data integrity within a database with respect to the concurrent execution of a first higher priority stream of transactions with a second lower priority stream of transactions, wherein the database comprises tasks, resources, and assignment relationships between the tasks and the resources, said method comprising the steps of:
copying a portion of the database into storage;
establishing the first higher priority stream in the database;
establishing the second lower priority stream in the storage; and
reconciling the second lower priority stream with the first higher priority stream such that the first stream has data priority over the second stream and the database satisfies predetermined liveness and safety constraints, wherein said reconciling step comprises:
identifying all tasks and resources that have been modified in the database since copying a portion of the database into storage;
identifying the tasks in the storage that are assigned to modified resources in the database;
identifying the tasks in the storage that are modified in the database, unassigning in the storage the resources assigned to tasks for those tasks identified as being modified in the database or as being assigned to modified resources;
assigning unmodified resources from the database to a portion of the tasks in the storage that are unmodified in the database and require resources; and
establishing a disjoint union of the assignment relationships in the storage together with the assignment relationships associated with modified tasks and modified resources in the database.

* * * * *